Figure 1:
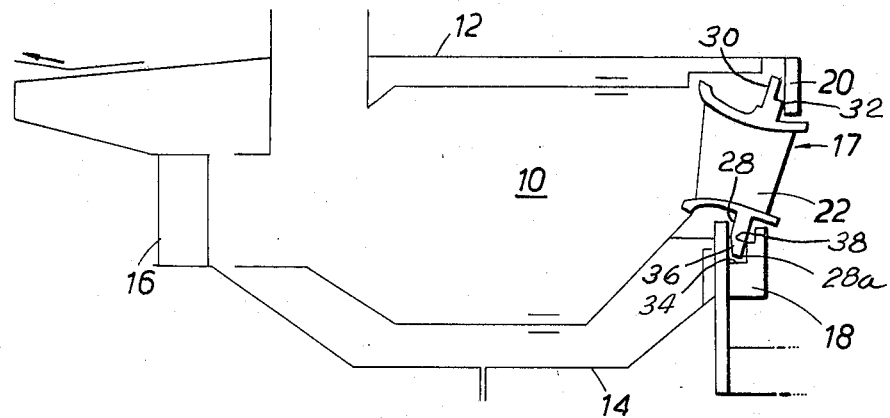

United States Patent [19]
Whinfrey

[11] 3,909,155
[45] Sept. 30, 1975

[54] SEALING OF VANED ASSEMBLIES

[75] Inventor: Kenneth George Whinfrey, Darley Abbey, Derby, England

[73] Assignee: Rolls-Royce (1971) Limited, London, England

[22] Filed: June 20, 1974

[21] Appl. No.: 481,408

[30] Foreign Application Priority Data
July 6, 1973 United Kingdom............ 32443/73

[52] U.S. Cl. ............... 415/138; 415/217; 415/218
[51] Int. Cl.² ........................................ F01D 25/24
[58] Field of Search ........... 415/216, 217, 218, 136, 415/138, 139

[56] References Cited
UNITED STATES PATENTS

| | | |
|---|---|---|
| 2,447,942 | 8/1948 | Imbert et al. ............ 415/136 |
| 3,302,926 | 2/1967 | Bobo ...................... 415/136 |
| 3,529,904 | 9/1970 | Scalzo et al. ............ 415/136 |
| 3,824,034 | 7/1974 | Leicht ..................... 415/217 |
| 3,829,233 | 8/1974 | Scalzo et al. ............ 415/136 |
| 3,843,279 | 10/1974 | Crossley et al. ......... 415/138 |

*Primary Examiner*—Henry F. Raduazo
*Attorney, Agent, or Firm*—Cushman, Darby & Cushman

[57] ABSTRACT

A nozzle guide vane assembly for a gas turbine engine includes one or more vanes, each provided with a radially inner and a radially outer shroud member. The assembly is adapted to be supported between radially inner and radially outer support members. One or more of the shroud members are provided with a chordally extending straight sealing edge adapted to sealingly contact one of the radially inner and outer support members.

15 Claims, 2 Drawing Figures

U.S. Patent  Sept. 30,1975  3,909,155

SEALING OF VANED ASSEMBLIES

This invention relates to the sealing of vaned assemblies and is particularly, though not exclusively, concerned with sealing the nozzle guide vanes which are located at the downstream end of the combustion chamber of a gas turbine engine.

In one form of known construction, two guide vanes are cast integrally with inner and outer shroud members to form a vane assembly and each vane assembly is secured to inner and outer housings of the engine. In operation, the inner and outer housings can expand axially to different extents, thereby causing each vane assembly to tilt slightly which results in the line contact between the vane assemblies and the inner and outer housings being broken. This allows high pressure cooling air to leak out into the hot gas stream causing a drop in power and efficiency and an increase in fuel consumption.

The present invention seeks to overcome this problem by allowing the vane assemblies to tilt and by providing chordal line contact between the vane assemblies and the inner and outer housings.

The present invention provides a vane assembly for a gas turbine engine, the vane assembly including at least one vane and a radially inner and a radially outer shroud member connected to said vane, at least one of said shroud members having a chordally extending straight sealing edge, the sealing edge being adapted to sealingly contact one of radially inner and outer vane assembly support members. The straight chordally extending sealing edge may be formed on a flange provided on one or both of the shroud members.

The vane assembly, which may be in the form of a gas turbine engine nozzle guide vane assembly, can include two or more vanes cast integrally with the inner and outer shroud members.

The invention further provides a gas turbine engine having an annular array of nozzle guide vanes supported between inner and outer support members, the vanes being arranged in a series of vane assemblies, each said assembly including at least one vane having a radially inner and a radially outer shroud member, each vane assembly being free to tilt with respect to the inner and outer support members, and the support members and the shrouds being arranged so that a line sealing contact is made between the shroud members and the respective support members throughout the range of tilting movement of the vane assemblies.

Preferably, at least one of the shroud members of each vane assembly is provided with a chordally extending straight sealing edge which is arranged to contact a corresponding flat surface on one of the support members, although the chordally extending sealing edges may be provided on one or both of the support members and a flat surface provided on one or both of the shroud members.

Figure 2:
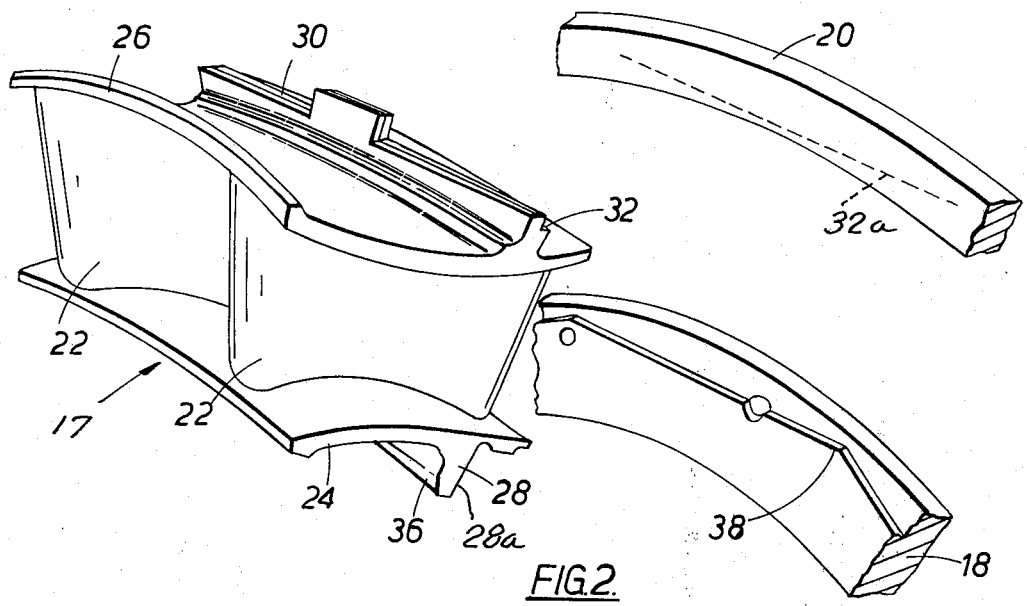

The present invention will now be more particularly described with reference to the accompanying drawings in which:

FIG. 1 shows a diagrammatic elevation of a portion of a gas turbine engine incorporating one form of vane assembly according to the present invention, and FIG. 2 shows a more detailed perspective view of the vane assembly shown in FIG. 1.

Referring to the drawing, a gas turbine engine has a combustion chamber 10 with an outer housing 12, an inner housing 14 and a row of inlet guide vanes 16. At the downstream end of the combustion chamber an annular array of nozzle guide vane assemblies 17 are supported by two ring members 18 and 20 which are attached to the inner and outer housings, 14 and 12 respectively.

Each vane assembly consists of two vanes 22 cast integrally with a radially inner arcuate shroud 24 and a radially outer arcuate shroud 26 and each shroud is provided with a radially extending flange 28 and 30 respectively. The flange 30 has a chordally extending straight sealing edge 32 which sealingly contacts on a straight line as indicated at 32a in FIG. 2, the flat front face of the ring support member 20.

The flange 28 sits in a slot 34 defined by the ring support member 18 and the inner housing 14, and the upstream face of the flange is chamfered at 36 to allow the vane assembly to tilt about the base of the flange in the slot 34. The downstream face 28a of the flange 28 is a flat surface which sealingly contacts on a straight line a chordally extending straight sealing edge 38 which is formed on the upstream face of the ring support member 18. When the engine is not operating, each vane assembly 17 is built with a tilt as shown to an exaggerated extent in FIG. 1. When the engine is operating, the inner housing 14 can expand linearly to a greater extent than the outer housing 12 so bringing the vane towards the optimum attitude for efficient operation. The gas loads on each vane assembly will cause sealing contact to be maintained between the edge 32 on the outer flange 30 and the ring support member 20 and the downstream face of the flange 28 and the edge 38 to prevent to a large extent the escape of cool, high pressure air into the hot gas stream passing over the vanes 22.

In alternative arrangements (not shown), a sealing edge may be formed on the flange 28 instead of or as well as the sealing edge 32 on the flange 30 with a corresponding flat surface on the ring support member 18 instead of or as well as the flat surface on the ring support member 20.

I claim:

1. A vane assembly for a gas turbine engine, and support means for said assembly, the vane assembly including at least one vane and a radially inner and radially outer shroud member connected to the vane, said support means comprising radially inner and outer support members movably axially relative to each other, said vane assembly being supported between and tiltable by axial relative movement of said radially inner and outer support members, at least one of said shroud members having a chordally extending straight sealing edge cooperating with one of the radially inner and outer support members to make a continuous chordal line sealing contact there between throughout a range of tilt of said vane assembly caused by axial relative movement of said radially inner and outer support members.

2. A vane assembly as claimed in claim 1 wherein each shroud member has a radially extending flange.

3. A vane assembly as claimed in claim 2 wherein the chordally extending sealing edge is formed on the flange on said radially outer shroud member.

4. A vane assembly as claimed in claim 2 wherein the chordally extending sealing edge is formed on the flange on said radially inner shroud member.

5. A vane assembly as claimed in claim 2 wherein a chordally extending sealing edge is formed on the flanges on each of said shroud members.

6. A vane assembly as claimed in claim 1 wherein said vane assembly is in the form of a gas turbine engine nozzle guide vane assembly and has two vanes.

7. A gas turbine engine having an annular array of nozzle guide vanes and radially inner and outer support members capable of having at least relative axial movrment, said annular array of nozzle guide vanes being supported between said radially inner and outer support members, said vanes being arranged in a series of vane assemblies, each said assembly including at least one vane having a radially inner and a radially outer shroud member, and arranged to tilt with respect to said radially inner and outer support members when said inner and outer support members have relative axial movement, said support members and said radially inner and outer shroud members having cooperating means defining a chordal line sealing contact between said shroud members and said support members throughout a complete range of tilting movement of said vane assemblies caused by relative axial movement of said support members.

8. A gas turbine engine as claimed in claim 7 wherein said chordal line sealing contact is defined by a chordally extending sealing edge formed on one of said shroud members and a flat surface formed on a corresponding one of said radially inner and outer support members.

9. A gas turbine engine as claimed in claim 8 wherein said chordally extending sealing edge is formed on said radially outer shroud member.

10. A gas turbine engine as claimed in claim 7 wherein said chordal line sealing contact is defined by a chordally extending sealing edge formed on one of said support members and a flat surface formed on a corresponding one of said radially inner and outer shroud members.

11. A gas turbine engine as claimed in claim 10 wherein said chordally extending sealing edge is formed on said radially inner support member.

12. A vane assembly for a gas turbine engine and support means for said vane assembly, said vane assembly including at least one vane and a radially inner shroud member and a radially outer shroud member connected to said vane, said support means comprising a radially inner support member and a radially outer support member, said radially inner support member and said radially outer support member capable of having at least relative axial movement, said vane assembly being supported between said radially inner support member and said radially outer support member, seal means between said outer shroud member and said outer support member and between said inner shroud member and said inner support member, at least one of said seal means being a line contact chordal seal throughout any tilting of said vane assembly caused by any relative axial movement of said inner support member and said outer support member, and including a chordally extending straight sealing edge on one of said members and a flat surface on the cooperating other of said members.

13. A vane assembly as claimed in claim 12 in which said chordally extending straight sealing edge is on one of said inner shroud member and said outer shroud member.

14. A vane assembly as claimed in claim 12 in which said chordally extending straight sealing edge is on one of said radially inner support member and said radially outer support member.

15. A vane assembly as claimed in claim 12 wherein each of said seal means includes a line contact chordal seal throughout any tilting of said vane assembly caused by any relative axial movement of said inner support member and said outer support member.

* * * * *